United States Patent
Xiao et al.

(10) Patent No.: US 10,679,052 B2
(45) Date of Patent: Jun. 9, 2020

(54) HEAD MOUNTED DISPLAY DEVICE, OBJECT TRACKING APPARATUS AND METHOD FOR TRACKING OBJECT THEREOF

(71) Applicant: HTC Corporation, Taoyuan (TW)

(72) Inventors: Bo-Wen Xiao, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 73 days.

(21) Appl. No.: 15/886,833

(22) Filed: Feb. 2, 2018

(65) Prior Publication Data

US 2018/0260624 A1    Sep. 13, 2018

Related U.S. Application Data

(60) Provisional application No. 62/470,360, filed on Mar. 13, 2017.

(51) Int. Cl.
| | | |
|---|---|---|
| G06K 9/00 | (2006.01) | |
| H04N 5/33 | (2006.01) | |
| G06F 3/01 | (2006.01) | |
| G06T 7/70 | (2017.01) | |

(52) U.S. Cl.
CPC ......... *G06K 9/00604* (2013.01); *G06F 3/013* (2013.01); *G06T 7/70* (2017.01); *H04N 5/33* (2013.01); *G06T 2207/10048* (2013.01); *G06T 2207/30201* (2013.01)

(58) Field of Classification Search
CPC ...... G06K 9/00604; H04N 5/33; G06F 3/013; G06T 7/70; G06T 2207/30201; G06T 2207/10048
See application file for complete search history.

(56) References Cited

U.S. PATENT DOCUMENTS

2015/0035744 A1*  2/2015  Robbins ............... G02B 27/017
                                                     345/156

FOREIGN PATENT DOCUMENTS

CN         105531716         4/2016

OTHER PUBLICATIONS

"Office Action of Taiwan Counterpart Application," dated Jan. 3, 2019, p. 1-p. 5.

* cited by examiner

*Primary Examiner* — James M Pontius
(74) *Attorney, Agent, or Firm* — JCIPRNET

(57) ABSTRACT

A head mounted display device, an object tracking apparatus and a method for tracking object thereof are provided. The object tracking apparatus includes a lens, a light splitting device, a programmable light source and an image extractor. The lens generates and projects a detection light beam to an object. The programmable light source has a plurality of sub-light sources. The sub-light sources respectively project a plurality of light beams to a plurality of positions of the light splitting device. The programmable light source receives a driving signal, and adjusts a light-on status of each of the sub-light sources according to the driving signal. The image extractor extracts a detection image from the object. Wherein, the light splitting device receives at least one of the light beams and generates at least one reflection light beam to the lens, and the lens generates the detection light beam accordingly.

8 Claims, 7 Drawing Sheets

HEAD MOUNTED DISPLAY DEVICE, OBJECT TRACKING APPARATUS AND METHOD FOR TRACKING OBJECT THEREOF

CROSS-REFERENCE TO RELATED APPLICATION

This application claims the priority benefit of U.S. provisional application Ser. No. 62/470,360, filed on Mar. 13, 2017. The entirety of the above-mentioned patent application is hereby incorporated by reference herein and made a part of specification.

BACKGROUND OF THE INVENTION

Field of the Invention

The invention relates to a head mounted display device, an object tracking apparatus and an object tracking method, and particularly relates to an object tracking apparatus and an object tracking method that allows adaptive adjustments.

Description of Related Art

In the current technical field, eyeball tracking technology is often used in electronic appliances, especially when it is related to virtual reality display technology. With the eyeball tracking technology, the virtual reality display creates a foveated rendering effect to reduce the computation load of image processing and lower the system requirement of the virtual reality display, and thereby provide a better human-computer interaction.

In the prior art, constant winking of the user causes the pupil reflex glints are often covered. Also, eyelash or eye accessories may also cause the pupil reflex glints being covered. All these situations may result in errors and reduces the accuracy of eye tracking.

SUMMARY OF THE INVENTION

A head mounted display device, an object tracking apparatus and an object tracking method are provided for effectively enhancing the accuracy of object tracking.

The object tracking apparatus of the invention includes a lens, a light splitting device, a programmable light source and an image extractor. The lens generates and projects a detection light beam to an object. The light splitting device and the lens are disposed together on the axis. The programmable light source has a plurality of sub-light sources. The plurality of sub-light sources are adapted for respectively projecting a plurality of light beams to a plurality of positions of the light splitting device, and the programmable light source receives a driving signal for adjusting a light-on status of each of the plurality of sub-light sources. The image extractor extracts a detection image from the object. The light splitting device receives at least one of the plurality of light beams and generates at least one reflection light beam to the lens, such that the lens generates the detection light beam.

The head mounted display device of the invention includes a display and an object tracking apparatus as described in the foregoing, wherein the display is disposed on the axis and projects a display image to the lens.

The object tracking method of the invention includes the following. A lens and a light splitting device are provided. The lens and the light splitting device are disposed on an axis. A programmable light source having a plurality of sub-light sources is provided, wherein the plurality of sub-light sources are adapted for respectively projecting a plurality of light beams to a plurality of positions of the light splitting device, and a driving signal is provided for adjusting a light-on status of each of the plurality of sub-light sources. The light splitting device receives at least one of the plurality of light beams and generates at least one reflection light beam to the lens, such that the lens generates a detection light beam and projects the detection light beam to an object. An image extractor for extracting a detection image from the object is provided.

Based on the foregoing, a programmable light source is provided, and a plurality of light beams are projected to a plurality of positions of the light splitting device by dynamically adjusting the light emitting pattern of the programmable light source in order to detect the object with an on-axis and/or an off-axis method and thereby enhances the accuracy of object detecting.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
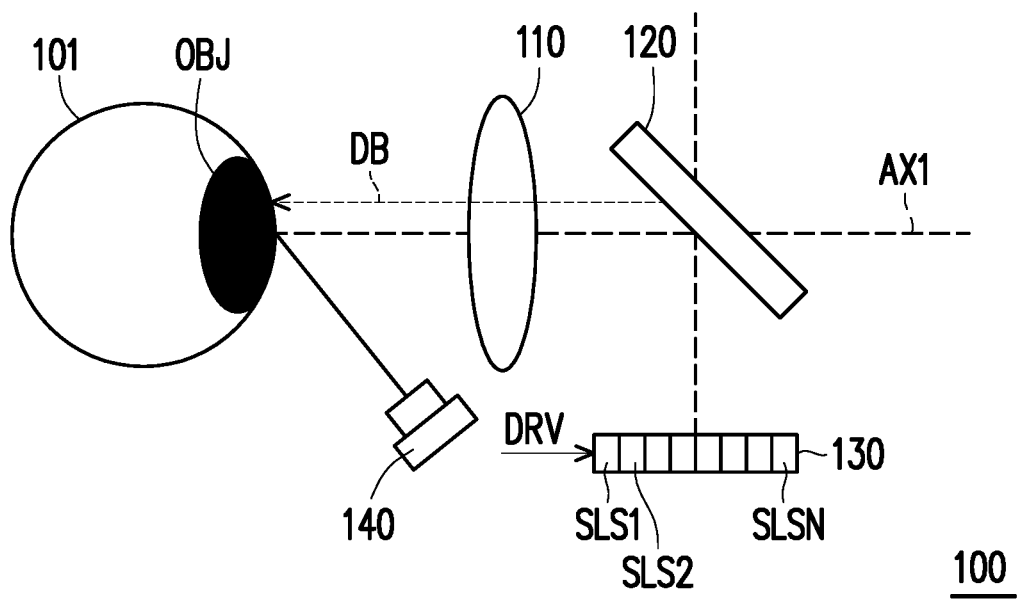
FIG. 1 is a schematic view of an object tracking apparatus according to a first embodiment of the invention.

Some other embodiments of the invention are provided as follows. It should be noted that the reference numerals and part of the contents of the previous embodiment are used in the following embodiments, in which identical reference numerals indicate identical or similar components, and repeated description of the same technical contents is omitted. Please refer to the description of the previous embodiment for the omitted contents, which will not be repeated hereinafter.

Referring to FIG. 1, FIG. 1 is a schematic view of an object tracking apparatus according to a first embodiment of the invention. In this embodiment, an object tracking apparatus 100 is adapted for tracking the position of an eyeball OBJ of an eye 101. The object tracking apparatus 100 includes a lens 110, a light splitting device 120, a programmable light source 130 and an image extractor 140. The lens 110 is disposed on an axis AX1. The lens 110 is adapted for generating a detection light beam DB and projecting the detection light beam DB to an object (eyeball OBJ), and the eyeball OBJ reflects light correspondingly through the detection light beam DB. The light splitting device 120 and the lens 110 are disposed together on the axis AX1, wherein the lens 110 is disposed between the eyeball OBJ and the light splitting device 120, and the axis AX1 may pass through a geometric center of the lens 110 and the light splitting device 120. In addition, the programmable light source 130 is disposed on a side of the light splitting device 120 and is isolated from the axis AX1. The programmable light source 130 may have a plurality of sub-light sources SLS1 to SLSN. The plurality of sub-light sources SLS1 to SLSN are respectively disposed at a plurality of positions of the programmable light source 130, and are adapted for respectively projecting a plurality of light beams to a plurality of positions of the light splitting device 120. The light splitting device 120 may reflect the plurality of light beams projected by the plurality of sub-light sources SLS1 to SLSN and transmit the plurality of reflection light beams to the lens 110. The lens 110 concentrates the plurality of reflection light beams and generates the detection light beam DB.

Figure 2:
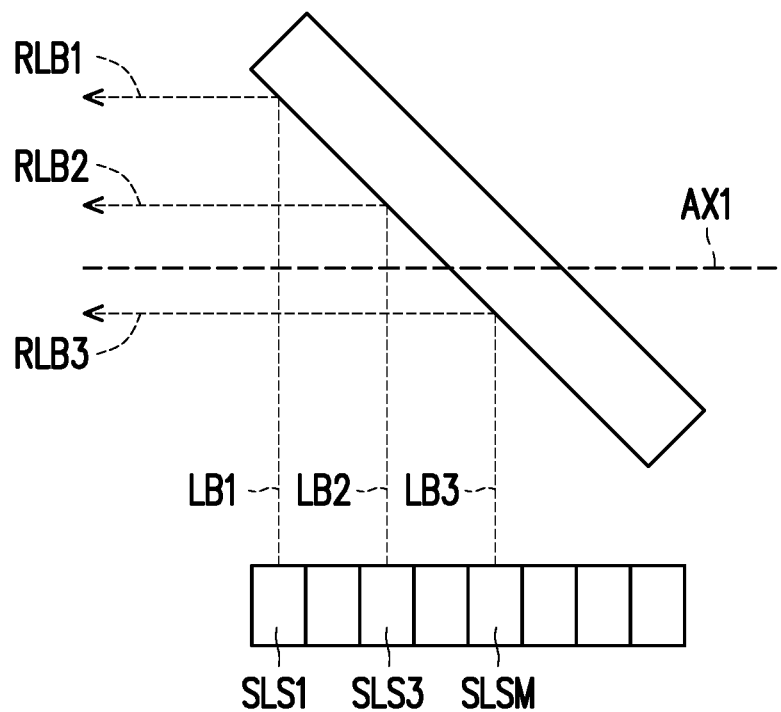
FIG. 2 is a schematic view showing the operation of a programmable light source according to an embodiment of the invention.

It should be noted that the programmable light source 130 receives a driving signal DRV, and adjusts a light-on status of each of the sub-light sources SLS1 to SLSN according to the driving signal DRV. The sub-light sources SLS1 to SLSN may all be light-on, or only a part of the sub-light sources SLS1 to SLSN is light-on. There is no specific limitation thereto. Referring to both FIG. 1 and FIG. 2 for the following, FIG. 2 is a schematic view showing the operation of a programmable light source according to an embodiment of the invention. In FIG. 2, taking the sub-light source SLS1, the sub-light source SLS3 and the sub-light source SLSM on the programmable light source 130 for example, the sub-light source SLS1, the sub-light source SLS3 and the sub-light source SLSM are respectively adapted for projecting a light beam LB1, a light beam LB2 and a light beam LB3 to different positions of the light splitting device 120. The light splitting device 120 reflects the projected light beam LB1, the projected light beam LB2 and the projected light beam LB3, and respectively generates a reflection light beam RLB1, a reflection light beam RLB2 and a reflection light beam RLB3. FIG. 2 clearly shows that the reflection light beam RLB1 and the reflection light beam RLB3 are rather distant from the axis AX1, as the reflection light beam RLB2 travels substantially close to the axis AX1. In other words, when the sub-light source SLS3 is light-on, the object tracking apparatus 100 may generate the detection light beam DB to project to the eyeball OBJ by an on-axis detection method. In addition, when at least one of the sub-light sources SLS1 and SLSM is light-on, the object tracking apparatus 100 may generate the detection light beam DB to project to the eyeball OBJ by an off-axis detection method.

It should be noted herein that, in this embodiment, any two of the sub-light sources SLS1, SLS3 and SLSM may be turned to light-on at the same time or at different timings. In other words, according to the driving signal DRV, any one of the plurality of sub-light sources SLS1 to SLSN on the programmable light source 130 may be turned to light-on, or not turned to light-on, independently. Taking FIG. 2 as an example, when the sub-light sources SLS1 and SLSM are light-on (the sub-light sources SLS2 is not light-on), the programmable light source 130 may provide the light beams LB1 and LB3 and generate the detection light beam DB thereby. The light beams LB1 and LB3 are off-axis lights. In contrast, when the sub-light sources SLS2 is light-on (the sub-light sources SLS1 and SLSM are not light-on), the programmable light source 130 may provide the light beam LB2 and generate the detection light beam DB thereby. The light beam LB2 is an on-axis light.

Referring to FIG. 1 again, the image extractor 140 is disposed on a side of the axis AX1 and is adapted for extracting the detection image of the object (the eyeball OBJ). When the detection light beam is projected to the eyeball OBJ, the eyeball OBJ may reflect light corresponding to the detection light beam DB. As such, the image extractor 140 may obtain a detection image having a glint (a light spot generated by light reflection, for example). For example, taking the eyeball OBJ as the object to be detected, when the detection light beam DB is projected to the eyeball OBJ, a plurality of glints generated by light reflection may appear on the periphery of the eyeball OBJ. By locating the plurality of glints generated by light reflection, the actual location of the eyeball OBJ is identified.

It should also be mentioned that, in this embodiment, the image extractor 140 may be an infrared light camera, and the plurality of sub-light sources SLS1 to SLSN on the programmable light source 130 may be infrared light sources (for example, infrared light emitting diodes).

Figure 3:
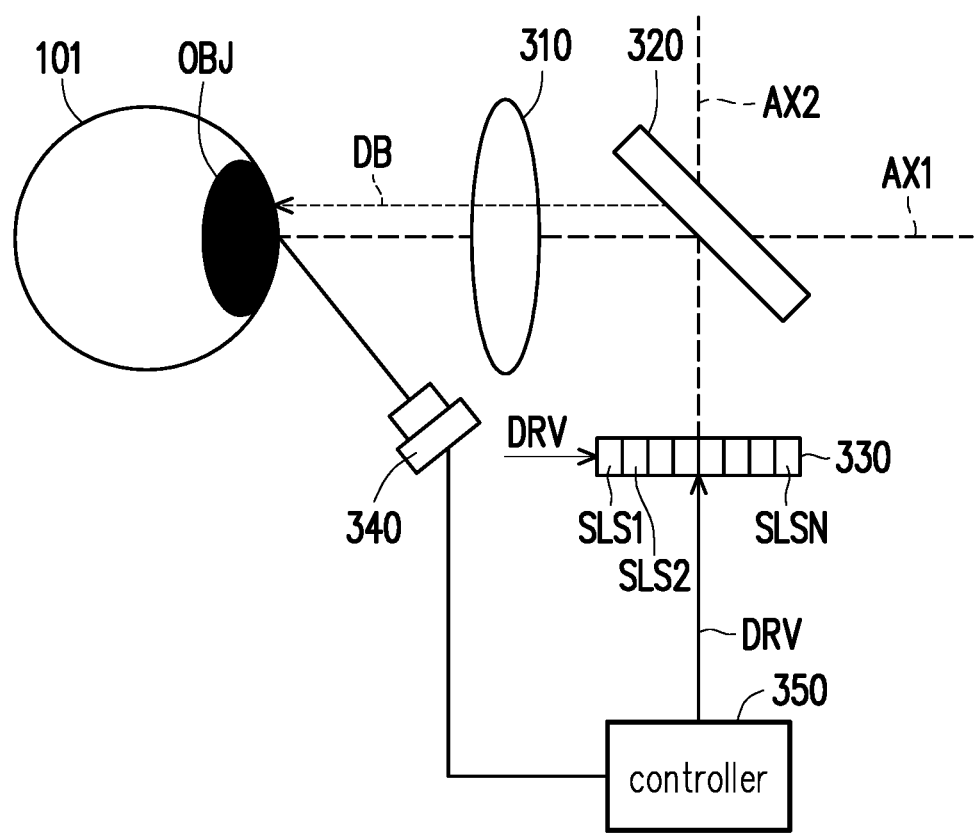
FIG. 3 is a schematic view of an object tracking apparatus according to another embodiment of the invention.

Referring to FIG. 3, FIG. 3 is a schematic view of an object tracking apparatus according to another embodiment of the invention. The object tracking apparatus 300 includes a lens 310, a light splitting device 320, a programmable light source 330 and a controller 350. In this embodiment, the lens 310 and the light splitting device 320 are disposed in sequence on the front end of the eyeball OBJ and are disposed on the axis AX1. Moreover, a geometrical center of the programmable light source 330 is disposed on an axis AX2, and a geometrical center of the light splitting device 320 passes through the axis AX2. The programmable light source 330 receives a driving signal DRV, and controls each of the plurality of sub-light sources on the programmable light source 330 to be light-on or not light-on according to the driving signal DRV.

In this embodiment, the controller 350 is coupled to the image extractor 340 and the programmable light source 330. The controller 350 generates and provides the driving signal DRV to drive the programmable light source 330. The controller 350 additionally receives a detection image generated by the image extractor 340, and determines a position information of the eyeball OBJ according to the light reflection of the eyeball OBJ corresponding to a detection light beam as shown in the detection image.

In this embodiment, the controller 350 may generate the driving signal DRV according to a plurality of preset patterns, adjust the driving signal DRV in sequence according to the plurality of preset patterns, and adjust the light-on status of the plurality of sub-light sources on the programmable light source 330. Referring to FIG. 4A to FIG. 4E for the following, FIG. 4A to FIG. 4E are respectively schematic views showing the operation of a programmable light source adjusting a light-on status according to an embodiment of the invention.

Figure 4A:
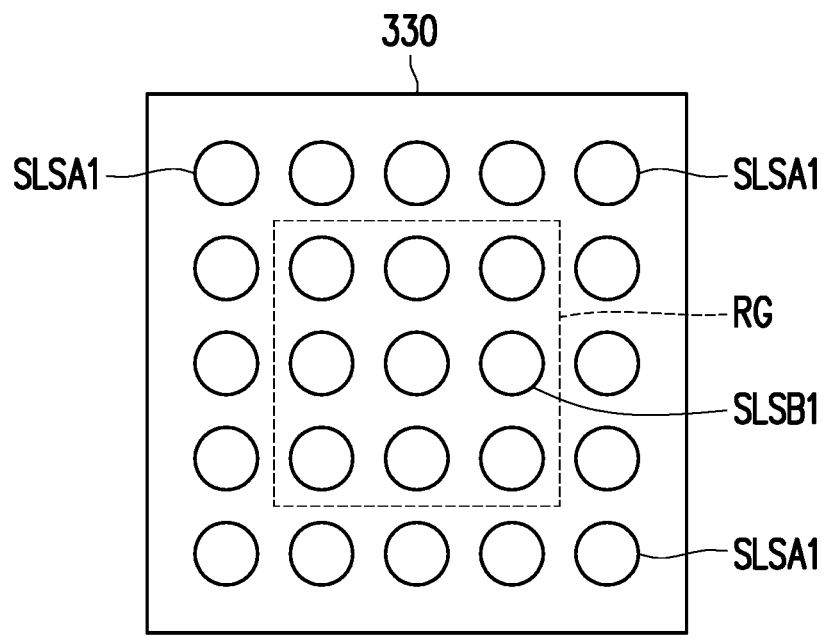
FIG. 4A to FIG. 4E are respectively schematic views showing the operation of a programmable light source adjusting a light-on status according to an embodiment of the invention.

In FIG. 4A, the programmable light source 330 may be classified into a plurality of first sub-light sources SLSA1 and a plurality of second sub-light sources SLSB1 according to a boundary RG. In this embodiment, the plurality of sub-light sources outside the boundary RG are classified as the first sub-light sources SLSA1, and the plurality of sub-light sources within the boundary RG are classified as the second sub-light sources SLSB1. In this embodiment, the plurality of first sub-light sources SLSA1 may project light beams to a periphery region of the light splitting device 320, and the plurality of second sub-light sources SLSB1 may project light beams to a central region of the light splitting device 320. Moreover, in this embodiment, the controller 350 may provide the driving signal DRV such that at least one of the plurality of first sub-light sources SLSA1 is turned to light-on during a first time period and at least one of the plurality of second sub-light sources SLSB1 is turned to light-on during a second time period, wherein the first time period and the second time period do not overlap with each other, partly overlap with each other, or completely overlap with each other.

Figure 4B:
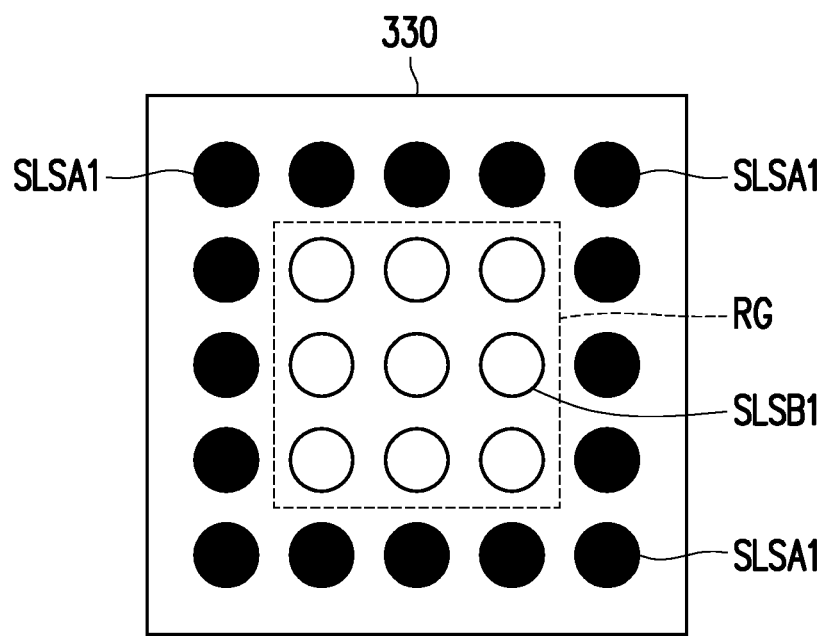
Figure 4C:
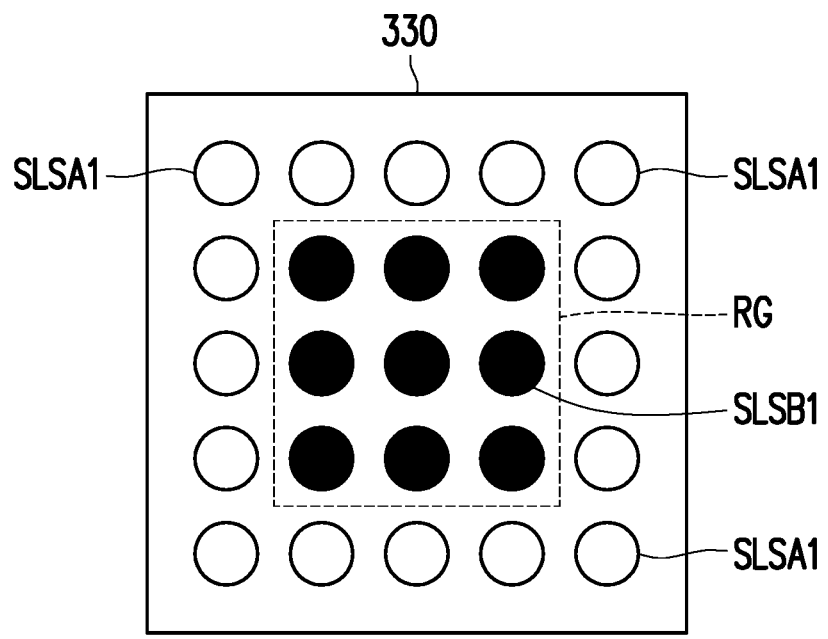

As for examples of the first time period and the second time period not overlapping with each other, please refer to FIG. 4B and FIG. 4C. In FIG. 4B, during the first time period, all of the plurality of first sub-light sources SLSA1 are turned to light-on, and all of the plurality of second sub-light sources SLSB1 are not light-on. In FIG. 4C, during the second time period, all of the plurality of first sub-light sources SLSA1 are not light-on, and all of the plurality of second sub-light sources SLSB1 are turned to light-on. As such, the object tracking apparatus 300 may generate a detection signal through on-axis light and off-axis light alternately at different timings.

Figure 4D:
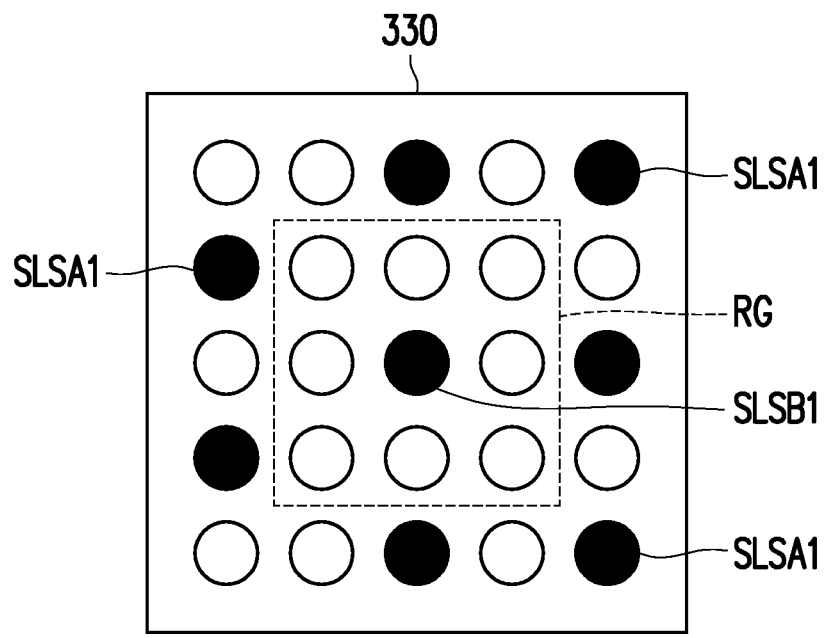
Figure 4E:
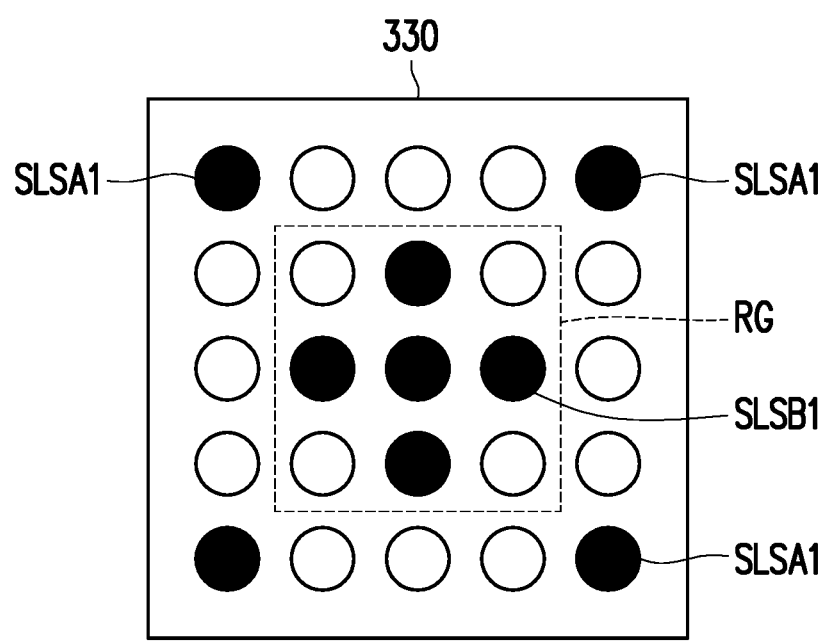

As for examples of the first time period and the second time period completely overlapping with each other and of the first time period and the second time period partly overlapping with each other, please refer to FIG. 4D and FIG. 4E. In FIG. 4D and FIG. 4E, during an overlapping time period of the first and the second time periods, part of the plurality of first sub-light sources SLSA1 and part of the plurality of second sub-light sources SLSB1 are turned to light-on. As such, the object tracking apparatus 300 generates a detection signal through on-axis light and off-axis light at different timings in a time period when the first and second time periods do not overlap, and generate a detection signal through on-axis light and off-axis light simultaneously in the overlapping time period of the first and second time periods. Accordingly, the object tracking apparatus 300 has a better sensibility in detecting movements.

It should also be noted that the rectangle programmable light source 330 as illustrated in FIG. 4A to FIG. 4E is merely a descriptive example and should not be construed as a limitation to the invention. The programmable light source according to an embodiment of the invention may be in any shapes, for example, may be a circle, oval, rectangle or in any irregular shape. Also, the arrangement of the plurality of sub-light sources on the programmable light source are not limited to the form of a matrix. The plurality of sub-light sources on the programmable light source according to an embodiment of the invention may be arranged according to a predetermined order or may be arranged randomly without an order, which is not particularly limited.

Figure 5:
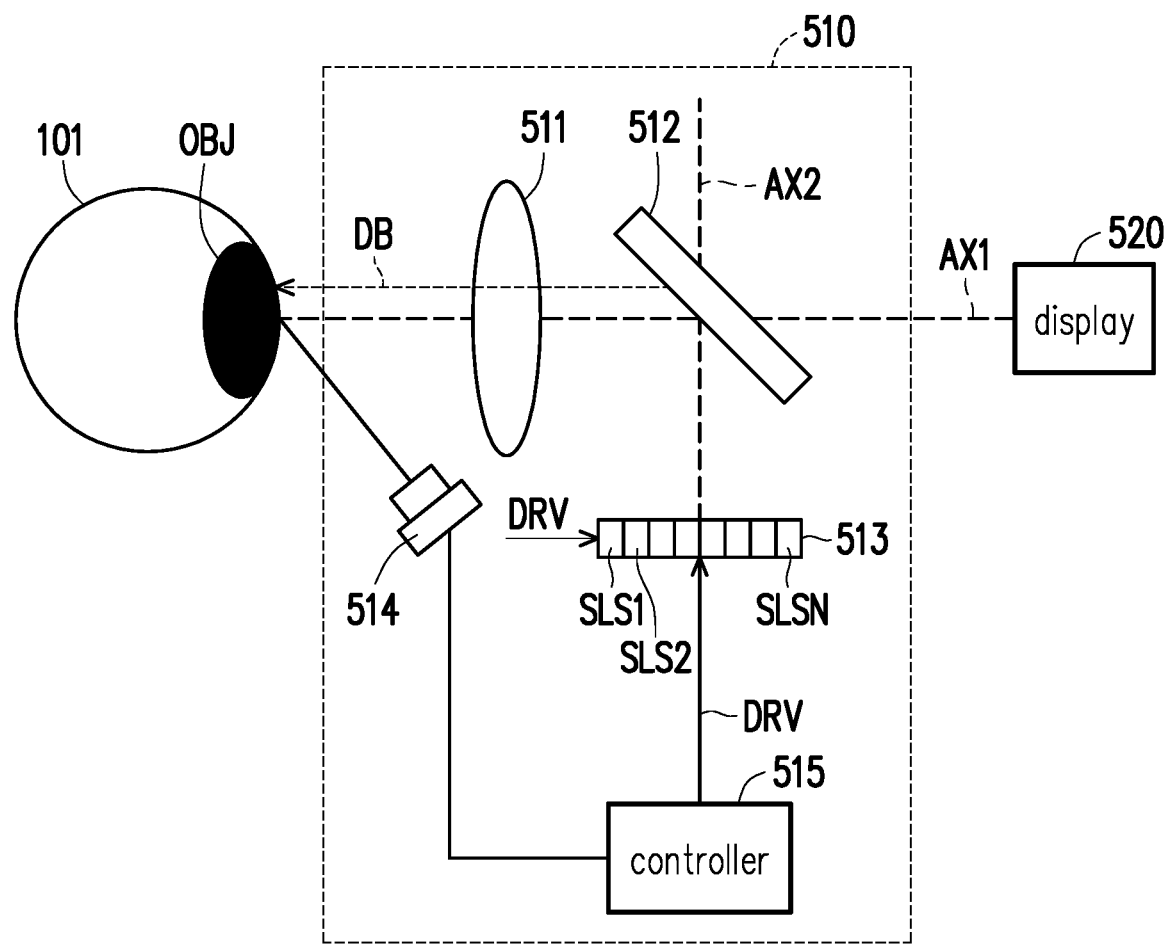
FIG. 5 is a schematic view of a head mounted display device according to an embodiment of the invention.

Referring to FIG. 5, FIG. 5 is a schematic view of a head mounted display device according to an embodiment of the invention. A head mounted display device 500 includes an object tracking apparatus 510 and a display 520. The object tracking apparatus 510 includes a lens 511, a light splitting device 512, a programmable light source 513, an image extractor 514 and a controller 515. Implementation details of the object tracking apparatus 510 are similar to those of the object tracking apparatus specified in the foregoing embodiments and thus are not repeated hereinafter. It should be noted that the display 520 may be disposed on an axis AX1 for generating a display image and may project the display image to the light splitting device 512 along the axis AX1. The light splitting device 512 may project the display image such that the display image is projected to the lens 511 and then transmitted through the lens 511 to the eyeball OBJ of the user.

It should be noted herein that the head mounted display device 500 may include one set of the display 520 and the corresponding object tracking apparatus 510 or two sets of the display 520 and the corresponding object tracking apparatus 510. The number of the display 520 and the corresponding object tracking apparatus 510 disposed may be different according to the appliance of the head mounted display device 500 and is not particularly limited.

Figure 6:
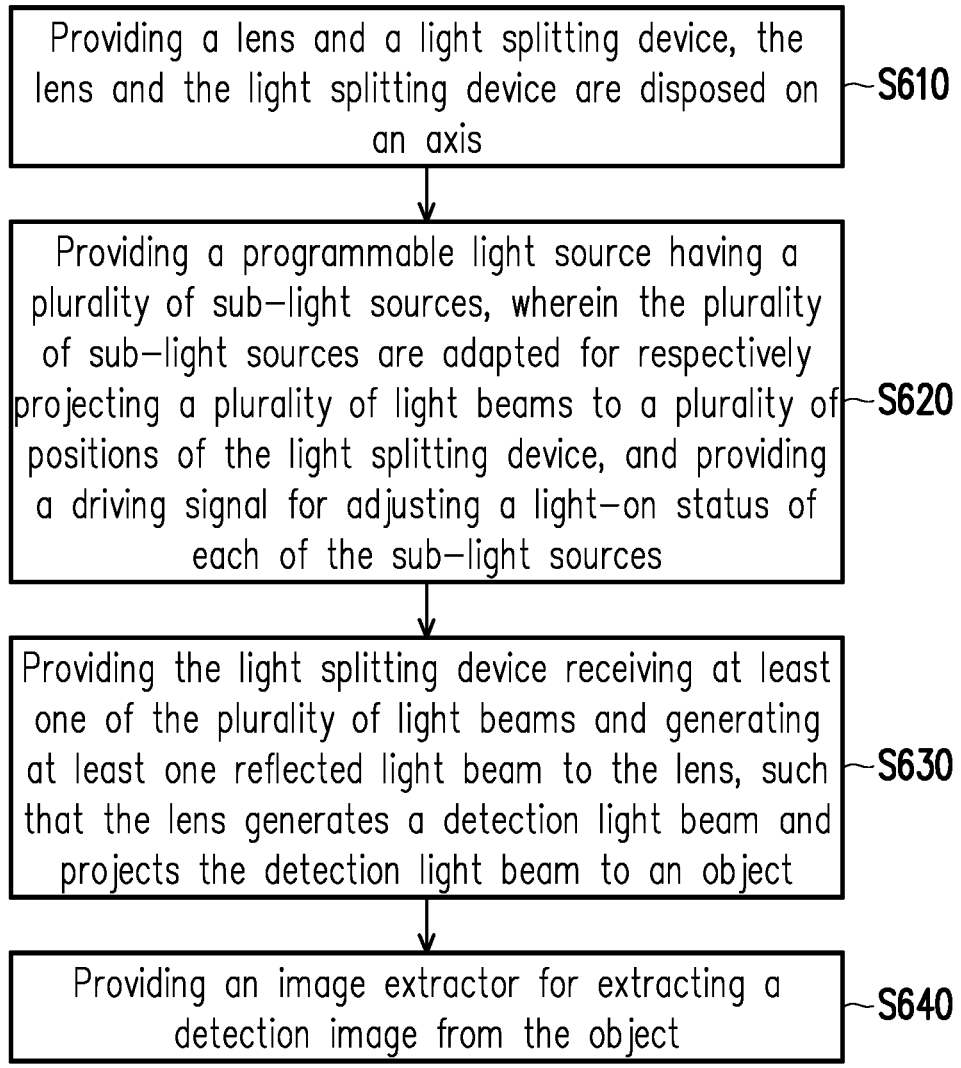
FIG. 6 is a flow chart showing an object tracking method according to an embodiment of the invention.

Referring to FIG. 6, FIG. 6 is a flow chart showing an object tracking method according to an embodiment of the invention. In step S610, a lens and a light splitting device is provided to be disposed on an axis. In step S620, a programmable light source having a plurality of sub-light sources is provided, wherein the plurality of sub-light sources are adapted for respectively projecting a plurality of light beams to a plurality of positions of the light splitting device, and a driving signal is provided for adjusting a light-on status of each of the plurality of sub-light sources. In step S630, the light splitting device receives at least one of the plurality of light beams and generates at least one of the plurality of reflection light beams to the lens, such that the lens generates a detection light beam and projects the detection light beam to an object. In step S640, an image extractor is provided for extracting a detection image from the object.

Implementation details of the above steps have been specified in the foregoing embodiments and thus are not repeated hereinafter.

In sum of the foregoing, the invention provides a programmable light source and projects a plurality of light beams to a plurality of positions of the light splitting device with a plurality of sub-light sources to generate the detection light beam. As such, the object tracking apparatus dynamically adjusts the mechanism of generating detection light beam and thereby effectively enhances the accuracy of object tracking.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. An object tracking apparatus, comprising:
   a lens, generating and projecting a detection light beam to an object;
   a light splitting device, the light splitting device and the lens are disposed on an axis;
   a programmable light source, having a plurality of sub-light sources, the plurality of sub-light sources being adapted for respectively projecting a plurality of light beams to a plurality of positions of the light splitting device, the programmable light source receiving a driving signal and adjusting a light-on status of each of the plurality of sub-light sources according to the driving signal; and
   a camera, extracting a detection image from the object,
   wherein the light splitting device receives at least one of the plurality of light beams and generates at least one reflection light beam to the lens, such that the lens generates the detection light beam,
   wherein the plurality of sub-light sources comprise a plurality of first sub-light sources and a plurality of second sub-light sources; the plurality of first sub-light sources are adapted for respectively providing a plurality of first light beams to a central region of the light splitting device, and the plurality of second sub-light sources are adapted for respectively providing a plurality of second light beams to a periphery region of the light splitting device, wherein the plurality of first sub-light sources are turned on during a first time period, and the plurality of second sub-light sources are turned on during a second time period, and wherein the first time period and the second time period do not overlap with each other, nor partly overlap with each other.

2. The object tracking apparatus according to claim 1, further comprising:

a controller coupled to the programmable light source and the camera, generating the driving signal during a detection time period and receiving the detection image, the controller circuit determines a position information of the object according to the detection image.

3. The object tracking apparatus according to claim 2, wherein the controlling circuit generates the driving signal respectively at a plurality of time periods according to a plurality of preset patterns.

4. The object tracking apparatus according to claim 1, wherein the plurality of sub-light sources are infrared light sources.

5. The object tracking apparatus according to claim 4, wherein the camera is an infrared light camera.

6. A head mounted display device, comprising:

a display; and the object tracking apparatus according to claim 1, wherein the display is disposed on the axis and projects a display image to the lens.

7. An object tracking method, comprising:

providing a lens and a light splitting device, the lens and the light splitting device are disposed on an axis;

providing a programmable light source having a plurality of sub-light sources, wherein the plurality of sub-light sources are adapted for respectively projecting a plurality of light beams to a plurality of positions of the light splitting device, and providing a driving signal for adjusting a light-on status of each of the sub-light sources;

the light splitting device receiving at least one of the plurality of light beams and generating at least one reflection light beam to the lens, such that the lens generates a detection light beam and projects the detection light beam to an object;

providing a camera for extracting a detection image from the object;

classifying the plurality of sub-light sources into a plurality of first sub-light sources and a plurality of second sub-light sources, wherein the plurality of first sub-light sources are adapted for respectively providing a plurality of first light beams to a central region of the light splitting device, and the plurality of second sub-light sources are adapted for respectively providing a plurality of second light beams to a periphery region of the light splitting device, wherein the plurality of first sub-light sources are turned on during a first time period, and the plurality of second sub-light sources are turned on during a second time period; and wherein the first time period and the second time period do not overlap with each other, nor partly overlap with each other.

8. The object tracking method according to claim 7, further comprising:

providing a controller, the controller generates the driving signal during a detection time period; and the controller receiving the detection image during the detection time period and determining a position information of the object according to the detection image.

* * * * *